United States Patent
Fu et al.

(10) Patent No.: US 9,819,590 B2
(45) Date of Patent: Nov. 14, 2017

(54) METHOD AND APPARATUS FOR NOTIFYING NETWORK ABNORMALITY

(71) Applicant: Huawei Technologies Co., Ltd., Shenzhen, Guangdong (CN)

(72) Inventors: Binzhang Fu, Being (CN); Guolong Jiang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 152 days.

(21) Appl. No.: 14/796,692

(22) Filed: Jul. 10, 2015

(65) Prior Publication Data

US 2015/0319090 A1    Nov. 5, 2015

Related U.S. Application Data

(63) Continuation of application No. PCT/CN2013/090586, filed on Dec. 26, 2013.

(30) Foreign Application Priority Data

Jan. 11, 2013  (CN) .......................... 2013 1 0010862

(51) Int. Cl.
*H04L 12/28* (2006.01)
*H04L 12/801* (2013.01)
(Continued)

(52) U.S. Cl.
CPC ............ *H04L 47/115* (2013.01); *H04L 41/06* (2013.01); *H04L 43/0888* (2013.01); *H04L 47/12* (2013.01)

(58) Field of Classification Search
CPC ............................... H04L 12/24; H04L 41/06
(Continued)

(56) References Cited

U.S. PATENT DOCUMENTS 9,692,690 B2 * 6/2017 Joshi ....................... H04L 45/38
2004/0044929 A1   3/2004 Chujo
(Continued)

FOREIGN PATENT DOCUMENTS

CN    101800675 A    8/2010
CN    103444132 A    12/2013
(Continued)

OTHER PUBLICATIONS

Nick McKeown, et al., "OpenFlow: Enabling Innovation in Campus Networks", Mar. 14, 2008, 6 pages.
(Continued)

*Primary Examiner* — Farah Faroul (57) ABSTRACT

A method and an apparatus for notifying a network abnormality are provided. An OpenFlow switch detects whether an abnormality occurs in an OpenFlow network. The OpenFlow switch sends a first asynchronous message for describing the abnormality occurring in the OpenFlow network to a controller when detecting an abnormality occurring in the OpenFlow network, so that the controller processes, according to the first asynchronous message, the abnormality occurring in the OpenFlow network. In this way, the abnormality in the network is notified in time, thereby improving efficiency in processing the abnormality in the OpenFlow network. A technical problem in the prior art that an abnormality occurring in an OpenFlow network and caused by an unexpected event cannot be notified in time, so that the abnormality occurring in the OpenFlow network cannot be processed in time and efficiency in processing the abnormality occurring in the OpenFlow network is relatively low is solved.

16 Claims, 3 Drawing Sheets

(51) Int. Cl.
*H04L 12/26* (2006.01)
*H04L 12/24* (2006.01)

(58) Field of Classification Search
USPC ........................................... 370/252
See application file for complete search history.

(56) References Cited

U.S. PATENT DOCUMENTS

| | | | |
|---|---|---|---|
| 2005/0108444 A1 | 5/2005 | Flauaus et al. | |
| 2011/0286324 A1* | 11/2011 | Bellagamba | H04L 41/0677 370/219 |
| 2012/0093158 A1* | 4/2012 | Chiba | H04L 45/38 370/392 |
| 2013/0188489 A1 | 7/2013 | Sato | |
| 2013/0286844 A1* | 10/2013 | Ishizuka | H04L 45/64 370/235 |
| 2013/0308651 A1* | 11/2013 | Ding | H04L 45/021 370/401 |
| 2014/0010235 A1 | 1/2014 | Ueno | |
| 2014/0269320 A1* | 9/2014 | DeCusatis | H04L 47/25 370/236 |
| 2015/0295818 A1* | 10/2015 | Hayashitani | H04L 45/28 370/221 |
| 2016/0191406 A1* | 6/2016 | Xiao | H04L 12/6418 370/235 |

FOREIGN PATENT DOCUMENTS

| | | |
|---|---|---|
| JP | 2005134984 A | 5/2005 |
| TW | 201225587 A | 6/2012 |
| WO | WO 2012/127894 A1 | 9/2012 |
| WO | WO 2012/130264 A1 | 10/2012 |

OTHER PUBLICATIONS

Mohammad Alizadeh, et al., Data Center TCP (DCTCP), SIGCOMM' 10, Aug. 30-Sep. 3, 2010, 12 pages.

Lingyun Lu, et al., "OpenFlow Control for Cooperating AQM Scheme", ICSP2010 Proceedings, 2010, p. 2560-2563.

Yasuhiro Yamasaki, et al., "Flexible Access Management System for Campus VLAN Based on OpenFlow", 2011 IEEE/IPSJ International Symposium on Applications and the Internet, 2011, p. 347-351.

"OpenFlow Switch Specification, Version 1.3.1 (Wire Protocol 0x04)", Open Networking Foundation, Sep. 6, 2012, 128 pages.

"OpenFlow Switch Specification Version 1.3.0 (Wire Protocol 0x04)," Open Networking Foundation, ONF-TS 006, Jun. 25, 2012, 106 pages.

* cited by examiner

METHOD AND APPARATUS FOR NOTIFYING NETWORK ABNORMALITY

CROSS-REFERENCE TO RELATED APPLICATIONS

This application is a continuation of International Application No. PCT/CN2013/090586, filed on Dec. 26, 2013, which claims priority to Chinese Patent Application No. 201310010862.8, filed on Jan. 11, 2013, both of which are hereby incorporated by reference in their entireties.

TECHNICAL FIELD

Embodiments of the present invention relate to communications technologies, and in particular, to a method and an apparatus for notifying a network abnormality.

BACKGROUND

An environment of large-scale modern networks is quite complex. In a process of network transmission, various abnormalities may occur. An OpenFlow (OpenFlow) network supports a controller to send, periodically or according to an instruction of an administrator, a query request to an OpenFlow switch to acquire related information, to detect, according to the acquired related information, whether an abnormality occurs in the OpenFlow network, and to process the abnormality when the abnormality occurs.

However, in the prior art, an abnormality that occurs in an OpenFlow network and is caused by an unexpected event, for example, network congestion caused by instantaneous excessive traffic, cannot be notified in time, so that the abnormality in the OpenFlow network cannot be processed in time and efficiency in processing the abnormality in the OpenFlow network is relatively low.

SUMMARY

Embodiments of the present invention provide a method and an apparatus for notifying a network abnormality, so as to notify, in time, an abnormality occurring in an OpenFlow network and improve efficiency in processing the abnormality occurring in the OpenFlow network.

According to a first aspect, a method for notifying a network abnormality is provided, including:

detecting, by an OpenFlow switch, whether an abnormality occurs in an OpenFlow network; and sending, by the OpenFlow switch, a first asynchronous message to a controller when it is detected that an abnormality occurs in the OpenFlow network, so that the controller processes, according to the first asynchronous message, the abnormality occurring in the OpenFlow network; where the first asynchronous message is used to describe the abnormality occurring in the OpenFlow network.

In a first possible implementation manner of the first aspect, before the sending, by the OpenFlow switch, a first asynchronous message to a controller, the method further includes:

sending, by the OpenFlow switch, a second asynchronous message to the controller when it is detected that the abnormality occurs in the OpenFlow network, where the second asynchronous message is used to indicate that the OpenFlow network is in an abnormal state; and receiving, by the OpenFlow switch, a query request message sent by the controller and according to the second asynchronous message, where the query request message is used to instruct the OpenFlow switch to send the first asynchronous message.

In a second possible implementation manner of the first aspect, the detecting, by an OpenFlow switch, whether an abnormality occurs in an OpenFlow network includes any of the following operations or any combination of the following operations:

detecting whether congestion occurs in the OpenFlow network;

detecting whether a loop occurs in the OpenFlow network;

detecting whether an unauthorized data flow exists in the OpenFlow network; and detecting whether a traffic abnormality occurs in the OpenFlow network.

With reference to the first aspect, the first possible implementation manner of the first aspect, or the second possible implementation manner of the first aspect, in a third possible implementation manner of the first aspect, the first asynchronous message includes type information of the abnormality occurring in the OpenFlow network, the type information is used to indicate a type of the abnormality occurring in the OpenFlow network, and the type of the abnormality occurring in the OpenFlow network includes at least one of the following: congestion occurring in a network, a loop occurring in a network, an unauthorized data flow existing in a network, and a traffic abnormality occurring in a network.

With reference to the third possible implementation manner of the first aspect, in a fourth possible implementation manner of the first aspect, the first asynchronous message further includes any one of the following information or any combination of the following information:

level information of the abnormality occurring in the OpenFlow network, where the level information is used to indicate severity of the abnormality occurring in the OpenFlow network;

status information of a device that generates the abnormality occurring in the OpenFlow network, where the status information of the device includes at least one of the following: statistical information of a port, statistical information of a queue, and statistical information of a flow table; and information about a data flow corresponding to the abnormality occurring in the OpenFlow network, where the information about the data flow is used to identify the data flow corresponding to the abnormality.

According to a second aspect, a method for notifying a network abnormality is provided, including:

receiving, by a controller, a first asynchronous message sent by an OpenFlow switch, where the first asynchronous message is generated and sent when the OpenFlow switch detects an abnormality occurring in an OpenFlow network, and the first asynchronous message is used to describe the abnormality occurring in the OpenFlow network; and processing, by the controller and according to the first asynchronous message, the abnormality occurring in the OpenFlow network.

In a first possible implementation manner of the second aspect, before the receiving, by a controller, a first asynchronous message sent by an OpenFlow switch, the method further includes:

receiving, by the controller, a second asynchronous message sent by the OpenFlow switch, where the second asynchronous message is used to indicate that the OpenFlow network is in an abnormal state; and sending, by the controller, a query request message to the OpenFlow switch according to the second asynchronous message, where the query request message is used to instruct the OpenFlow switch to send the first asynchronous message.

In a second possible implementation manner of the second aspect, the first asynchronous message includes type information of the abnormality that occurs in the OpenFlow network, the type information is used to indicate a type of the abnormality occurring in the OpenFlow network, and the type of the abnormality occurring in the OpenFlow network includes at least one of the following: congestion occurring in a network, a loop occurring in a network, an unauthorized data flow existing in a network, and a traffic abnormality occurring in a network.

With reference to the second possible implementation manner of the second aspect, in a third possible implementation manner of the second aspect, the processing, by the controller and according to the first asynchronous message, the abnormality occurring in the OpenFlow network includes:

querying, according to the type information in the first asynchronous message, a mapping relationship between a preset type of an abnormality and an abnormality processing policy to acquire an abnormality processing policy corresponding to the type information, where the abnormality processing policy is used to indicate an operation used for eliminating the abnormality that occurs in the OpenFlow network; and processing, according to the abnormality processing policy corresponding to the type information, the abnormality that occurs in the OpenFlow network.

With reference to the second possible implementation manner of the second aspect or the third possible implementation manner of the second aspect, in a fourth possible implementation manner of the second aspect, the first asynchronous message further includes any one of the following information or a combination of the following information:

level information of the abnormality occurring in the OpenFlow network, where the level information is used to indicate severity of the abnormality occurring in the OpenFlow network;

status information of a device that generates the abnormality occurring in the OpenFlow network, where the status information of the device includes at least one of the following: statistical information of a port, statistical information of a queue, and statistical information of a flow table; and information about a data flow corresponding to the abnormality occurring in the OpenFlow network, where the information about the data flow is used to identify the data flow corresponding to the abnormality.

According to a third aspect, an apparatus for notifying a network abnormality is provided, including:

a detecting module, configured to detect whether an abnormality occurs in an OpenFlow network; and a sending module, configured to send a first asynchronous message to a controller when it is detected that an abnormality occurs in the OpenFlow network, so that the controller processes, according to the first asynchronous message, the abnormality occurring in the OpenFlow network, where the first asynchronous message is used to describe the abnormality occurring in the OpenFlow network.

In a first possible implementation manner of the third aspect, the sending module is further configured to send a second asynchronous message to the controller, where the second asynchronous message is used to indicate that the OpenFlow network is in an abnormal state; and the apparatus for notifying a network abnormality further includes:

a receiving module, configured to receive a query request message sent according to the second asynchronous message and by the controller, where the query request message is used to instruct the OpenFlow switch to send the first asynchronous message.

In a second possible implementation manner of the third aspect, the detecting module is specifically configured to execute any of the following operations or any combination of the following operations:

detecting whether congestion occurs in the OpenFlow network;

detecting whether a loop occurs in the OpenFlow network;

detecting whether an unauthorized data flow exists in the OpenFlow network; and detecting whether an abnormality occurs in traffic of the OpenFlow network.

With reference to the third aspect, the first possible implementation manner of the third aspect, or the second possible implementation manner of the third aspect, in a third possible implementation manner of the third aspect, the first asynchronous message includes type of the abnormality that occurs in the OpenFlow network, the type is used to indicate a type of the abnormality that occurs in the OpenFlow network, and the type of the abnormality that occurs in the OpenFlow network includes at least one of the following: congestion occurs in a network, a loop occurs in a network, an unauthorized data flow exists in a network, and an abnormality occurs in traffic of a network.

With reference to the third possible implementation manner of the third aspect, in a fourth possible implementation manner of the third aspect, the first asynchronous message further includes any one of the following information or a combination of the following information:

level information of the abnormality that occurs in the OpenFlow network, where the level information is used to indicate severity of the abnormality that occurs in the OpenFlow network;

status information of a device that generates the abnormality that occurs in the OpenFlow network, where the status information of the device includes at least one of the following: statistical information of a port, statistical information of a queue, and statistical information of a flow table; and information about a data flow corresponding to the abnormality that occurs in the OpenFlow network, where the information about the data flow is used to identify the data flow corresponding to the abnormality.

According to a fourth aspect, an apparatus for notifying a network abnormality is provided, including:

a receiving module, configured to receive a first asynchronous message sent by an OpenFlow switch, where the first asynchronous message is sent when the OpenFlow switch detects that an abnormality occurs in an OpenFlow network, and the first asynchronous message is used to describe the abnormality that occurs in the OpenFlow network; and a processing module, configured to process, according to the first asynchronous message, the abnormality that occurs in the OpenFlow network.

In a first possible implementation manner of the fourth aspect, the receiving module is further configured to receive a second asynchronous message sent by the OpenFlow switch, where the second asynchronous message is used to indicate that the OpenFlow network is in an abnormal state; and the apparatus for notifying a network abnormality further includes:

a sending module, configured to send a query request message to the OpenFlow switch according to the second asynchronous message, where the query request message is used to instruct the OpenFlow switch to send the first asynchronous message.

In a second possible implementation manner of the fourth aspect, the first asynchronous message includes type information of the abnormality occurring in the OpenFlow network, the type information is used to indicate a type of the abnormality occurring in the OpenFlow network, and the type of the abnormality occurring in the OpenFlow network includes at least one of the following: congestion occurring in a network, a loop occurring in a network, an unauthorized data flow existing in a network, and a traffic abnormality occurring in a network.

With reference to the second possible implementation manner of the fourth aspect, in a third possible implementation manner of the fourth aspect, the processing module is specifically configured to query, according to the type information in the first asynchronous message, a mapping relationship between a preset type of an abnormality and an abnormality processing policy to acquire an abnormality processing policy corresponding to the type information, where the abnormality processing policy is used to indicate an operation used for eliminating the abnormality that occurring in the OpenFlow network; and process, according to the abnormality processing policy corresponding to the type information, the abnormality occurring in the OpenFlow network.

With reference to the second possible implementation manner of the fourth aspect or the third possible implementation manner of the fourth aspect, in a fourth possible implementation manner of the fourth aspect, the first asynchronous message further includes any one of the following information or any combination of the following information:

level information of the abnormality occurring in the OpenFlow network, where the level information is used to indicate severity of the abnormality occurring in the OpenFlow network;

status information of a device that generates the abnormality occurring in the OpenFlow network, where the status information of the device includes at least one of the following: statistical information of a port, statistical information of a queue, and statistical information of a flow table; and information about a data flow corresponding to the abnormality occurring in the OpenFlow network, where the information about the data flow is used to identify the data flow corresponding to the abnormality.

According to the method for notifying a network abnormality provided in the embodiments of the present invention, when it is detected that an abnormality occurs in an OpenFlow network, an OpenFlow switch sends, to a controller, a first asynchronous message for describing the abnormality occurring in the OpenFlow network, so that the controller processes, according to status information of the abnormality, the abnormality occurring in the OpenFlow network. Because an actively detecting manner is used by the OpenFlow switch, the abnormality occurring in the OpenFlow network is notified in time, thereby improving efficiency in processing the abnormality occurring in the OpenFlow network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
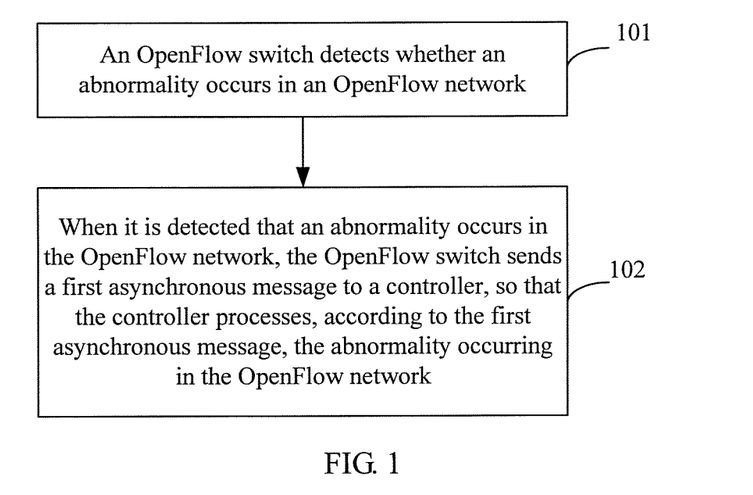
FIG. 1 is a schematic flowchart of a method for notifying a network abnormality according to an embodiment of the present invention.

FIG. 1 is a schematic flowchart of a method for notifying a network abnormality according to an embodiment of the present invention. As shown in FIG. 1, the method for notifying a network abnormality in this embodiment may include the following steps:

101. An OpenFlow switch detects whether an abnormality occurs in an OpenFlow network.

The OpenFlow switch acquires network monitoring data by using a counter on the OpenFlow switch, and detects whether an abnormality occurs in the OpenFlow network by detecting, according to the acquired network monitoring data, whether congestion occurs in the OpenFlow network, whether a loop occurs in the OpenFlow network, whether an unauthorized data flow exists in the OpenFlow network, whether a traffic abnormality occurs in the OpenFlow network, and the like. The network monitoring data includes but is not limited to: statistical information of a data flow, statistical information of an aggregated flow, statistical information of a flow table, statistical information of a port, statistical information of a queue of a port, statistical information of a group, description information of a group, type information of a group, statistical information of a meter, configuration information of a meter, characteristic information of a meter, characteristic information of a table, and the like.

For example, to detect whether congestion occurs in the OpenFlow network, detection may be performed on statistical information of a port and statistical information of a queue of a port, and if a queue depth, a packet loss rate, or a packet delay of the port exceeds a threshold, it is detected that the congestion occurs in the OpenFlow network. A type of the abnormality is that congestion occurs in a port of a switch, and a level of the abnormality may be determined by using an extent that the queue depth, the packet loss rate, or the packet delay exceeds the threshold For example, to detect whether a loop occurs in the OpenFlow network, detection may be performed on all paths in the OpenFlow network that have dependency on each other.

For example, to detect whether overload on a link occurs, detection may be performed on the link, and if traffic transmitted over the link or a quantity of data flows transmitted over the link exceeds a threshold, it is detected that an abnormality occurs in the OpenFlow network. A type of the abnormality is that overload on the link occurs, and a level of the abnormality may be determined by using an extent that the traffic transmitted over the link or the quantity of the data flows transmitted over the link exceeds the threshold.

For example, to detect whether an unauthorized data flow exists in the OpenFlow network, a matching expression corresponding to an unauthorized data flow that needed to be detected is preset in a flow table, and detection may be performed on whether the data flow that needed to be detected matches the matching expression.

For example, to detect whether a traffic abnormality occurs in the OpenFlow network, detection may be performed on whether bandwidth occupied by data flows sharply increases or on whether a quantity of data flows sharply increases, and if it is detected that the bandwidth occupied by the data flows sharply increase or it is detected that the quantity of the data flows sharply increases, an abnormality occurs in the traffic of the OpenFlow network. A level of the abnormality may be determined by using an extent of a sharp increase.

102. When it is detected that an abnormality occurs in the OpenFlow network, the OpenFlow switch sends a first asynchronous message to a controller, so that the controller processes, according to the first asynchronous message, the abnormality that occurs in the OpenFlow network.

The first asynchronous message is used to describe the abnormality that occurs in the OpenFlow network.

The first asynchronous message includes: an OpenFlow network protocol packet header, and type information of the abnormality that occurs in the network. The type information of the abnormality is used to indicate a type of the abnormality that occurs in the OpenFlow network, and the type of the abnormality occurring in the OpenFlow network includes at least one of the following: congestion occurring in a network, a loop occurring in a network, an unauthorized data flow existing in a network, and an abnormality occurring in traffic of a network.

The first asynchronous message may further include any one of the following information or any combination of the following information: level information of the abnormality occurring in the OpenFlow network, status information of a device that generates the abnormality occurring in the OpenFlow network, an identification code of a device that generates the abnormality occurring in the OpenFlow network, and data flow information corresponding to the abnormality occurring in the OpenFlow network. The level information is used to indicate severity of the abnormality occurring in the OpenFlow network. The status information of the device includes at least one of statistical information of a port, statistical information of a queue, and statistical information of a flow table; and the data flow information is used to identify the data flow corresponding to the abnormality. In addition, the statistical information of a port in the status information of the device includes but is not limited to: statistical information of a volume of data sent by the port or statistical information of a quantity of data flows sent by the port. The statistical information of the queue in the status information of the device includes but is not limited to: a depth of the queue, a threshold of the queue, or a quantity of data flows included in the queue. The statistical information of the flow table in the status information of the device includes but is not limited to: an identification code of the flow table, a quantity of active entries of the flow table, a quantity of idle entries of the flow table, and statistical information of a quantity of data flows that match the flow table or statistical information of a packet that matches the flow table. The information about the data flow includes but is not limited to: a destination physical address, a source physical address, a type of an Ethernet frame, a destination Internet Protocol (Internet Protocol, IP) address, a source IP address, a destination port number, a source port number, an identification code of an input port, an identification code of an output port, an identification code of a virtual local area network (Virtual Local Area Network, VLAN), a VLAN priority, an explicit congestion notification (Explicit Congestion Notification, ECN) in an IP network, an Internet Control Message Protocol (Internet Control Message Protocol, ICMP) type, an ICMP code, duration of the data flow, a priority of the data flow, a time of idle timeout, a time of hard timeout, a quantity of packets included in the data flow, a quantity of bytes included in the data flow, and an identification code of a destination user or an identification code of a source user.

Optionally, before sending the first asynchronous message to the controller, the OpenFlow switch sends a second asynchronous message to the controller when it is detected that the abnormality occurs in the OpenFlow network, where the second asynchronous message is used to indicate that the OpenFlow network is in an abnormal state; the OpenFlow switch receives a query request message sent, by the controller, according to the second asynchronous message, where the query request message is used to instruct the OpenFlow switch to send the first asynchronous message; and the OpenFlow switch sends the first asynchronous message to the controller according to the query request message sent by the controller, so that the controller processes, according to the first asynchronous message, the abnormality that occurs in the OpenFlow network.

It should be noted that, the first asynchronous message may further include an identifier that is used to indicate whether the first asynchronous message includes one or any combination of the level information, the status information of the device, and the information about the data flow. If one or any combination of the level information, the status information of the device, and the information about the data flow is not included in the first asynchronous message, the foregoing information that is not included in the first asynchronous message may be sent to the controller as an independent message after the first asynchronous message is sent.

In this embodiment, when detecting an abnormality occurring in an OpenFlow network, the OpenFlow switch sends a first asynchronous message for describing the abnormality occurring in the OpenFlow network to a controller, so that the controller processes, according to the first asynchronous message, the abnormality occurring in the OpenFlow network. Therefore, the OpenFlow switch can actively detects the abnormality occurring in the OpenFlow network, and the abnormality occurring in the OpenFlow network may be notified in time, thereby improving efficiency in processing the abnormality occurring in the OpenFlow network.

Figure 2:
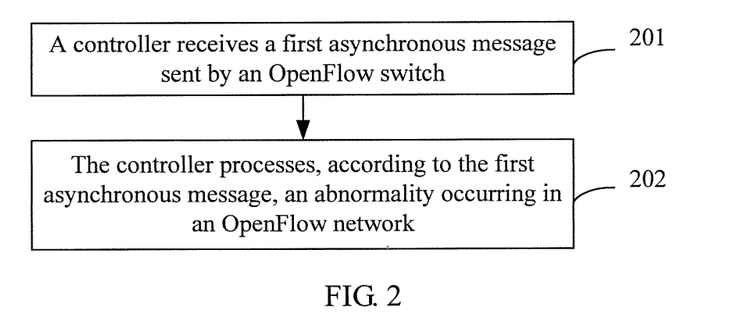
FIG. 2 is a schematic flowchart of a method for notifying a network abnormality according to another embodiment of the present invention.

FIG. 2 is a schematic flowchart of a method for processing a network abnormality according to another embodiment of the present invention. As shown in FIG. 2, the method for processing a network abnormality in this embodiment may include the following steps:

201. A controller receives a first asynchronous message sent by an OpenFlow switch.

The first asynchronous message is generated and sent when the OpenFlow switch detects that an abnormality occurs in an OpenFlow network, and the first asynchronous message is used to describe the abnormality occurring in the OpenFlow network. The first asynchronous message includes: an OpenFlow network protocol packet header, and type of the abnormality occurring in the network. The type of the abnormality is used to indicate a type of the abnormality occurring in the OpenFlow network, and the type of the abnormality that occurring in the OpenFlow network includes at least one of the following: congestion occurring in a network, a loop occurring in a network, an unauthorized data flow existing in a network, and an abnormality occurring in traffic of a network. The first asynchronous message may further include any one of the following information or any combination of the following information: level information of the abnormality occurring in the OpenFlow network, status information of a device that generates the abnormality occurring in the OpenFlow network, an identification code of a device that generates the abnormality occurring in the OpenFlow network, and information about a data flow corresponding to the abnormality occurring in the OpenFlow network. The level information is used to indicate severity of the abnormality occurring in the OpenFlow network; the status information of the device includes at least one of the following: statistical information of a port, statistical information of a queue, and statistical information of a flow table; the information about the data flow is used to identify the data flow corresponding to the abnormality.

Optionally, the controller receives a second asynchronous message that is used to indicate that the OpenFlow network is in an abnormal state, and is sent by the OpenFlow switch, and sends a query request message to the OpenFlow switch, so that the OpenFlow switch sends the first asynchronous message according to the query request message, and the controller receives the first asynchronous message sent by the OpenFlow switch.

202. The controller processes, according to the first asynchronous message, an abnormality occurring in an OpenFlow network.

The controller queries, according to the type of the abnormality in the first asynchronous message, a mapping relationship between a preset type of an abnormality and an abnormality processing policy to acquire an abnormality processing policy corresponding to the type; and processes, according to the abnormality processing policy corresponding to the type, the abnormality occurring in the OpenFlow network. The abnormality processing policy is used to indicate an operation used for eliminating the abnormality occurring in the OpenFlow network. The type of the abnormality includes but is not limited to at least one of the following: congestion occurring in a network, a loop occurring in a network, an unauthorized data flow exists in a network, and an abnormality occurring in traffic of a network.

For example, if the type of the abnormality is network congestion, the controller may perform, according to an abnormality processing policy corresponding to the network congestion, one or more of the following operations: sending an alarm to notify an administrator, recording a log, modifying a flow table to schedule a data flow, modifying a flow table to reduce a rate of sending a data flow, and modifying a flow table to selectively discard a packet of a data flow.

For example, if the type information of the abnormality is a loop occurring in a network, the controller may perform, according to an abnormality processing policy corresponding to the loop occurring in the network, one or more of the following operations: sending an alarm to notify an administrator, recording a log, modifying a flow table to schedule a data flow, and/or modifying a flow table to selectively discard a packet of a data flow.

For example, if the type information of the abnormality is link overload, the controller may perform, according to an abnormality processing policy corresponding to the link overload, one or more of the following operations: sending an alarm to notify an administrator, recording a log, modifying a flow table to schedule a data flow, modifying a flow table to reduce a rate of sending a data flow, and modifying a flow table to selectively discard a packet of a data flow.

For example, if the type information of the abnormality is an unauthorized data flow stream existing in a network, the controller may perform, according to an abnormality processing policy corresponding to the unauthorized data flow existing in the network, one or more of the following operations: sending an alarm to notify an administrator, recording a log, and modifying a flow table to discard all packets of a data flow.

For example, if the type information of the abnormality is abnormal traffic of a network, the controller may perform, according to an abnormality processing policy corresponding to the abnormal traffic of the network, one or more of the following operations: sending an alarm to notify an administrator, recording a log, modifying a flow table to isolate an abnormal data flow, and modifying a flow table to discard packets of all abnormal data flows. The abnormal data flows may be obtained from the data flow information, in the first asynchronous message, corresponding to the abnormality occurring in the network.

It should be noted that, the controller may further select, according to the level information, in the first asynchronous message, of the abnormality occurring in the OpenFlow network, a manner for processing the abnormality occurring in the OpenFlow network. If the level information indicates that the severity of the abnormality is relatively low, the controller may only record a log; if the level information indicates that the severity of the abnormality is average, the controller records a log and modify a flow table; and if the level information indicates that the severity of the abnormality is high, the controller may record a log, modify a flow table, and send an alarm to notify an administrator.

In this embodiment, a controller processes the abnormality occurring in the OpenFlow network according to a first asynchronous message sent when an OpenFlow switch detects an abnormality occurring in an OpenFlow network. Because an actively detecting manner is used by the OpenFlow switch, the abnormality occurring in the OpenFlow network may be notified in time, thereby improving efficiency in processing the abnormality occurring in the OpenFlow network. In addition, the controller processes the abnormality according to a type of the abnormality, thereby improving effectiveness of processing the abnormality in the OpenFlow network.

Figure 3:
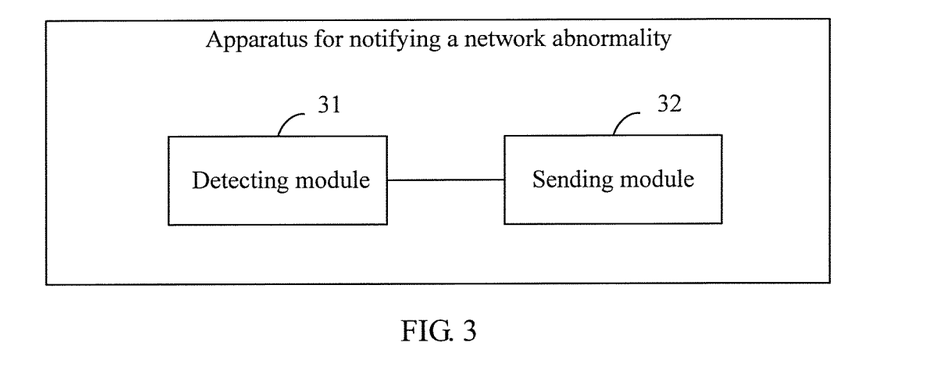
FIG. 3 is a schematic structural diagram of an apparatus for notifying a network abnormality according to another embodiment of the present invention.

FIG. 3 is a schematic structural diagram of an apparatus for notifying a network abnormality according to another embodiment of the present invention. As shown in FIG. 3, the apparatus for notifying a network abnormality in this embodiment may include: a detecting module 31 and a sending module 32.

The detecting module 31 is configured to detect whether an abnormality occurs in an OpenFlow network.

Optionally, the detecting module 31 is configured to detect whether the abnormality occurs in the OpenFlow network by executing any of the following operations or any combination of the following operations: detecting whether a congestion occurs in the OpenFlow network, detecting whether a loop occurs in the OpenFlow network, detecting whether an unauthorized data flow exists in the OpenFlow network, and detecting whether an traffic abnormality occurs in the OpenFlow network.

The sending module 32 is connected to the detecting module 31, and is configured to send a first asynchronous message to a controller when the detecting module detects that an abnormality occurs in the OpenFlow network, so that the controller processes, according to the first asynchronous message, the abnormality occurring in the OpenFlow network.

The first asynchronous message is used to describe the abnormality occurring in the OpenFlow network and includes type information of the abnormality occurring in the OpenFlow network. The type information is used to indicate a type of the abnormality occurring in the OpenFlow network, and the type of the abnormality occurring in the OpenFlow network includes at least one of the following: congestion occurring in a network, a loop occurring in a network, an unauthorized data flow existing in a network, and a traffic abnormality occurring in a network. The first asynchronous message further includes any one of the following information or any combination of the following information: level information of the abnormality occurring in the OpenFlow network, where the level information is used to indicate severity of the abnormality occurring in the OpenFlow network; status information of a device that generates the abnormality occurring in the OpenFlow network, where the status information of the device includes at least one of the following: statistical information of a port, statistical information of a queue, and statistical information of a flow table; and information about a data flow corresponding to the abnormality that occurs in the OpenFlow network, where the information about the data flow is used to identify the data flow corresponding to the abnormality.

The apparatus for notifying a network abnormality in this embodiment may be an OpenFlow switch.

Function modules of the apparatus for notifying a network abnormality provided in this embodiment may be configured to execute the method for notifying a network abnormality shown in FIG. 1, and a specific operating principle of the method is not repeated here. For details, reference is made to the description of the method embodiment.

In this embodiment, when the detecting module 31 detects that an abnormality occurs in an OpenFlow network, the sending module 32 sends a first asynchronous message for describing the abnormality occurring in the OpenFlow network to a controller, so that the controller processes, according to the first asynchronous message, the abnormality occurring in the OpenFlow network. Because an actively detecting manner is used by an OpenFlow switch, the abnormality occurring in the OpenFlow network may be notified in time, thereby improving efficiency in processing the abnormality occurring in the OpenFlow network.

Figure 4:
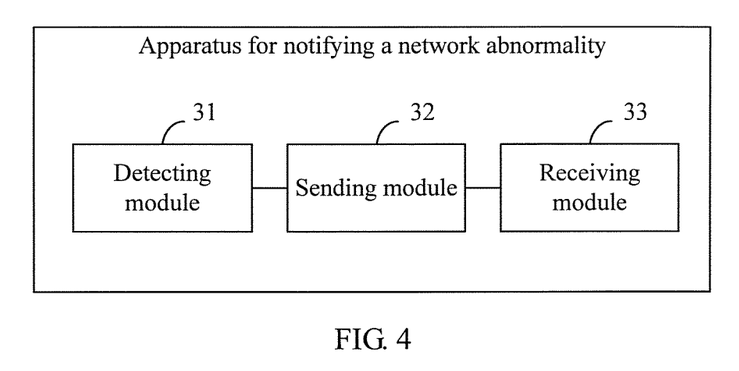
FIG. 4 is a schematic structural diagram of an apparatus for notifying a network abnormality according to another embodiment of the present invention.

FIG. 4 is a schematic structural diagram of an apparatus for notifying a network abnormality according to another embodiment of the present invention. As shown in FIG. 4, based on the foregoing embodiment, the sending module 32 is further configured to send a second asynchronous message to the controller, where the second asynchronous message is used to indicate that the OpenFlow network is in an abnormal state.

Based on this, the apparatus for notifying a network abnormality further includes a receiving module 33 connected to the sending module 32 and configured to receive a query request message sent by the controller according to the second asynchronous message, where the query request message is used to instruct the OpenFlow switch to send the first asynchronous message.

The sending module 32 is further configured to send the first asynchronous message to the controller according to the query request message received by the receiving module 33 after the receiving module 33 receives the query request message sent by the controller according to the second asynchronous message, so that the controller processes, according to the first asynchronous message, the abnormality occurring in the OpenFlow network.

The apparatus for notifying a network abnormality in this embodiment may be an OpenFlow switch.

Function modules of the apparatus for notifying a network abnormality provided in this embodiment may be configured to execute the method for notifying a network abnormality shown in FIG. 1, and a specific operating principle thereof is not repeated herein. For details, reference is made to the description of the method embodiment.

In this embodiment, when the detecting module 31 detects that an abnormality occurs in an OpenFlow network, the sending module 32 sends a first asynchronous message for describing the abnormality occurring in the OpenFlow network to a controller, so that the controller processes, according to the first asynchronous message, the abnormality occurring in the OpenFlow network. Because an actively detecting manner is used by an OpenFlow switch, the abnormality occurring in the OpenFlow network is notified in time, thereby improving efficiency in processing the abnormality occurring in the OpenFlow network.

Figure 5:
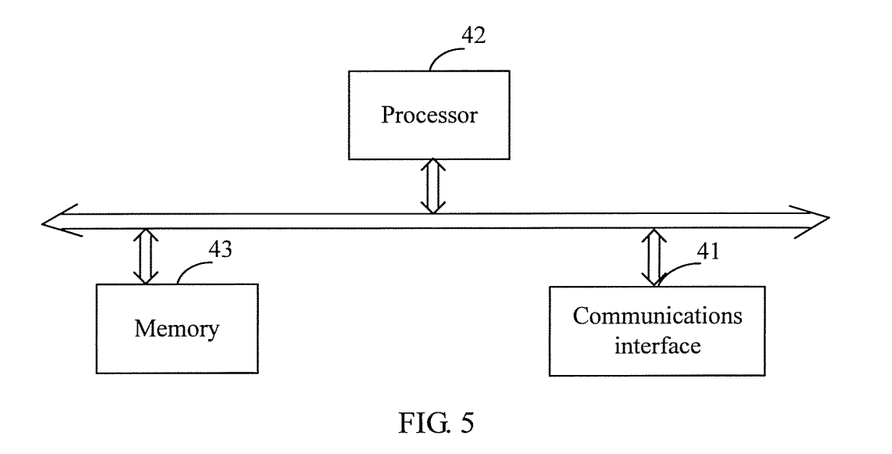
FIG. 5 is a schematic structural diagram of an apparatus for notifying a network abnormality according to another embodiment of the present invention.

FIG. 5 is a schematic structural diagram of an apparatus for notifying a network abnormality according to another embodiment of the present invention. As shown in FIG. 5, the apparatus for notifying a network abnormality in this embodiment may include: a communications interface 41, a processor 42, and a memory 43.

The memory 43 is configured to store a program. Specifically, the program may include program code, where the program code includes a computer operation instruction. The memory 43 may be a high-speed RAM memory, or may be a non-volatile memory (non-volatile memory), for example, at least one disk memory.

The processor 42 is configured to execute the program stored in the memory 43, so as to detect whether an abnormality occurs in an OpenFlow network, and generate a first asynchronous message when it is detected that an abnormality occurs in the OpenFlow network.

The processor 42 may be a central processing unit (Central Processing Unit, CPU), or an application-specific integrated circuit (Application Specific Integrated Circuit, ASIC), or one or more integrated circuits configured to implement this embodiment of the present invention.

Optionally, the processor 42 is specifically configured to execute any of the following operations or any combination of the following operations to detect whether the abnormality occurring in the OpenFlow network: detecting whether congestion occurs in the OpenFlow network, detecting whether a loop occurs in the OpenFlow network, detecting whether an unauthorized data flow exists in the OpenFlow network, and detecting whether a traffic abnormality occurs in the OpenFlow network.

The communications interface 41 is configured to send the first asynchronous message generated by the processor 42 to a controller, so that the controller processes, according to the first asynchronous message, the abnormality occurring in the OpenFlow network.

The first asynchronous message is used to describe the abnormality occurring in the OpenFlow network and includes type information of the abnormality occurring in the OpenFlow network. The first asynchronous message further includes any one of the following information or any combination of the following information: level information of the abnormality occurring in the OpenFlow network, where the level information is used to indicate severity of the abnormality occurring in the OpenFlow network; status information of a device that generates the abnormality occurring in the OpenFlow network, where the status information of the device includes at least one of the following: statistical information of a port, statistical information of a queue, and statistical information of a flow table; and information about a data flow corresponding to the abnormality occurring in the OpenFlow network, where the information about the data flow is used to identify the data flow corresponding to the abnormality. The type information of the abnormality includes at least one of the following: congestion occurring in a network, a loop occurring in a network, an unauthorized data flow existing in a network, and a traffic abnormality occurring in a network.

Optionally, the communications interface 41 is specifically configured to send a second asynchronous message to the controller, where the second asynchronous message is used to indicate that the OpenFlow network is in an abnormal state; receive a query request message sent by the controller according to the second asynchronous message; and send the first asynchronous message to the controller according to the query request message, so that the controller processes, according to the first asynchronous message, the abnormality occurring in the OpenFlow network.

Optionally, in specific implementation, if the communications interface 41, the processor 42, and the memory 43 are implemented independently of each other, the communications interface 41, the processor 42, and the memory 43 may be interconnected and implement mutual communication through a bus. The bus may be an industry standard architecture (Industry Standard Architecture, ISA) bus, a peripheral component interconnect (Peripheral Component interconnect, PCI) bus, an Extended Industry Standard Architecture (Extended Industry Standard Architecture, EISA) bus, or the like. The bus may be classified into an address bus, a data bus, a control bus, and the like. For convenience of denotation, the bus is represented by using only one thick line in FIG. 5; however, it does not indicate that there is only one bus or only one type of buses.

Optionally, in specific implementation, if the communications interface 41, the processor 42, and the memory 43 are integrated into a chip for implementation, the communications interface 41, the processor 42, and the memory 43 may implement mutual communication through an internal interface.

The apparatus for notifying a network abnormality in this embodiment may be an OpenFlow switch.

Function modules of the apparatus for notifying a network abnormality provided in this embodiment may be configured to execute the method for notifying a network abnormality shown in FIG. 1, and a specific operating principle of the method is not repeated herein. For details, reference is made to the description of the method embodiment.

In this embodiment, a processor detects whether an abnormality occurs in an OpenFlow network, and when it is detected that an abnormality occurs in the OpenFlow network, a communications interface sends a first asynchronous message for describing the abnormality occurring in the OpenFlow network to a controller, so that the controller processes, according to the first asynchronous message, the abnormality that occurs in the OpenFlow network. Because an actively detecting manner is used by an OpenFlow switch, the abnormality occurring in the OpenFlow network may be notified in time, thereby improving efficiency in processing the abnormality that occurring in the OpenFlow network.

Figure 6:
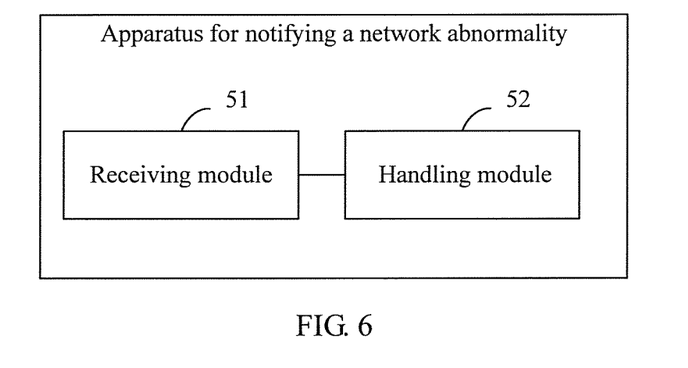
FIG. 6 is a schematic structural diagram of an apparatus for notifying a network abnormality according to another embodiment of the present invention.

FIG. 6 is a schematic structural diagram of an apparatus for notifying a network abnormality according to another embodiment of the present invention. As shown in FIG. 6, the apparatus for notifying a network abnormality in this embodiment may include: a receiving module 51 and a processing module 52.

The receiving module 51 is configured to receive a first asynchronous message sent by an OpenFlow switch, where the first asynchronous message is sent when the OpenFlow switch detects that an abnormality occurs in an OpenFlow network.

The first asynchronous message is used to describe the abnormality occurring in the OpenFlow network and includes type information of the abnormality occurring in the OpenFlow network. The first asynchronous message further includes any one of the following information or any combination of the following information: level information of the abnormality occurring in the OpenFlow network, where the level information is used to indicate severity of the abnormality occurring in the OpenFlow network; status information of a device that generates the abnormality occurring in the OpenFlow network, where the status information of the device includes at least one of the following: statistical information of a port, statistical information of a queue, and statistical information of a flow table; and information about a data flow corresponding to the abnormality occurring in the OpenFlow network, where the information about the data flow is used to identify the data flow corresponding to the abnormality. The type information of the abnormality includes at least one of the following: congestion occurring in a network, a loop occurring in a network, an unauthorized data flow existing in a network, and a traffic abnormality occurring in of a network.

The processing module 52 is connected to the receiving module 51, and is configured to process, according to the first asynchronous message received by the receiving module 51, the abnormality occurring in the OpenFlow network.

The apparatus for notifying a network abnormality in this embodiment may be a controller.

Function modules of the apparatus for notifying a network abnormality provided in this embodiment may be configured to execute the method for notifying a network abnormality shown in FIG. 2, and a specific operating principle is not repeated herein. For details, reference is made to the description of the method embodiment.

In this embodiment, a receiving module receives a first asynchronous message sent when an OpenFlow switch detects that an abnormality occurs in an OpenFlow network, and a processing module processes, according to the first asynchronous message, the abnormality occurring in the OpenFlow network. Because an actively detecting manner is used by the OpenFlow switch, the abnormality occurring in the OpenFlow network may be notified in time, thereby improving efficiency in processing the abnormality occurring in the OpenFlow network.

Figure 7:
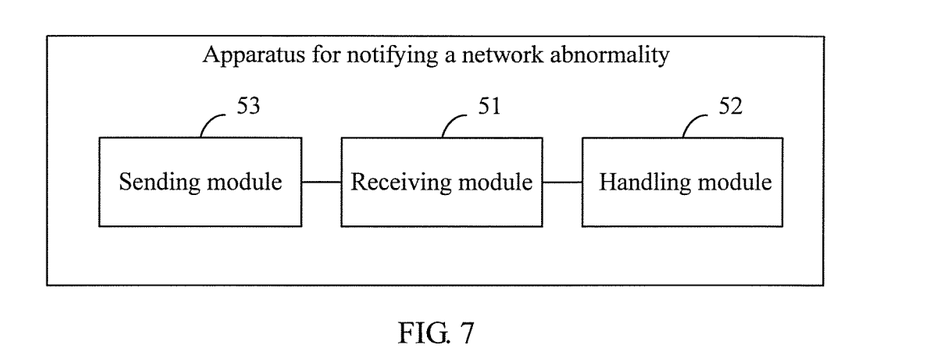
FIG. 7 is a schematic structural diagram of an apparatus for notifying a network abnormality according to another embodiment of the present invention.

FIG. 7 is a schematic structural diagram of an apparatus for notifying a network abnormality according to another embodiment of the present invention. As shown in FIG. 7, based on the foregoing embodiment, the receiving module 51 is further configured to receive a second asynchronous message sent by the OpenFlow switch, where the second asynchronous message is used to indicate that the OpenFlow network is in an abnormal state.

Based on this, the apparatus for notifying a network abnormality further includes a sending module 53 connected to the receiving module 51 and configured to send, according to the second asynchronous message sent by the OpenFlow switch, a query request message to the OpenFlow switch.

The receiving module 51 is further configured to, receive the first asynchronous message sent according to the query request message by the OpenFlow switch after the sending module 53 sends the query request message to the OpenFlow switch.

The processing module 52 is specifically configured to query, according to the type information in the first asynchronous message, a mapping relationship between a preset type of an abnormality and an abnormality processing policy to acquire an abnormality processing policy corresponding to the type information; and process, according to the abnormality processing policy corresponding to the type information, the abnormality occurring in the OpenFlow network. The abnormality processing policy is used to indicate an operation used for eliminating the abnormality occurring in the OpenFlow network.

The apparatus for notifying a network abnormality in this embodiment may be a controller.

Function modules of the apparatus for notifying a network abnormality provided in this embodiment may be configured to execute the method for notifying a network abnormality shown in FIG. 2, and a specific operating principle of the method is not repeated herein. For details, reference is made to the description of the method embodiment.

In this embodiment, a receiving module receives a first asynchronous message for describing an abnormality occurring in an OpenFlow network, where the first asynchronous message is sent when an OpenFlow switch detects that the abnormality occurs in the OpenFlow network; a processing module processes, according to the first asynchronous message, the abnormality occurring in the OpenFlow network. Because an actively detecting manner is used by the OpenFlow switch, the abnormality occurring in the OpenFlow network may be notified in time, thereby improving efficiency in processing the abnormality occurring in the OpenFlow network. In addition, a controller processes the abnormality according to a type of the abnormality, thereby improving effectiveness of processing the abnormality occurring in the OpenFlow network.

Figure 8:
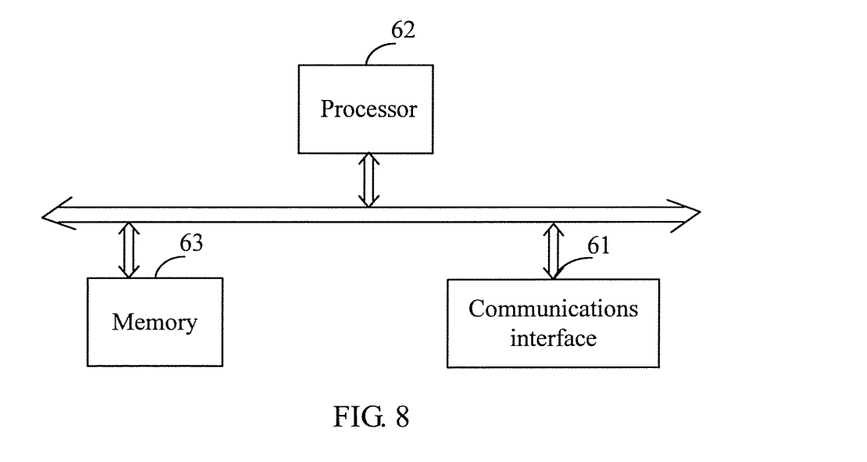
FIG. 8 is a schematic structural diagram of an apparatus for notifying a network abnormality according to another embodiment of the present invention.

FIG. 8 is a schematic structural diagram of an apparatus for notifying a network abnormality according to another embodiment of the present invention. As shown in FIG. 8, the apparatus for notifying a network abnormality in this embodiment may include: a communications interface 61, a processor 62, and a memory 63.

The memory 63 is configured to store a program. Specifically, the program may include program code, where the program code includes a computer operation instruction. The memory 63 may include a high-speed RAM memory, or may include a non-volatile memory, for example, at least one disk memory.

The communications interface 61 is configured to receive a first asynchronous message sent by an OpenFlow switch, where the first asynchronous message is generated and sent when the OpenFlow switch detects that an abnormality occurs in an OpenFlow network.

The first asynchronous message is used to describe the abnormality that occurs in the OpenFlow network and includes type information of the abnormality occurring in the OpenFlow network. The first asynchronous message further includes any one of the following information or any combination of the following information: level information of the abnormality occurring in the OpenFlow network, where the level information is used to indicate severity of the abnormality occurring in the OpenFlow network; status information of a device that generates the abnormality occurring in the OpenFlow network, where the status information of the device includes at least one of the following: statistical information of a port, statistical information of a queue, and statistical information of a flow table; and information about a data flow corresponding to the abnormality that occurs in the OpenFlow network, where the information about the data flow is used to identify the data flow corresponding to the abnormality. The type information of the abnormality includes at least one of the following: congestion occurring in a network, a loop occurring in a network, an unauthorized data flow existing in a network, and a traffic abnormality occurring in a network.

Optionally, the communications interface 61 is specifically configured to receive a second asynchronous message sent by the OpenFlow switch, where the second asynchronous message is used to indicate that the OpenFlow network is in an abnormal state; send a query request message to the OpenFlow switch according to the second asynchronous message; and receive the first asynchronous message sent according to the query request message by the OpenFlow switch.

The processor 62 is configured to execute the program stored in the memory 63, so as to process, according to the first asynchronous message received by the communications interface 61, the abnormality occurring in the network.

The processor 62 may be a central processing unit (Central Processing Unit, CPU), or an application-specific integrated circuit (Application Specific Integrated Circuit, ASIC), or one or more integrated circuits configured to implement this embodiment of the present invention.

Optionally, the processor 62 is specifically configured to query, according to the type information in the first asynchronous message received by the communications interface 61, a mapping relationship between a preset type of an abnormality and an abnormality processing policy to acquire an abnormality processing policy corresponding to the type information; and process, according to the abnormality processing policy corresponding to the type information, the abnormality occurring in the OpenFlow network. The abnormality processing policy is used to indicate an operation used for eliminating the abnormality that occurs in the OpenFlow network.

Optionally, in specific implementation, if the communications interface 61, the processor 62, and the memory 63 are implemented independently of each other, the communications interface 61, the processor 62, and the memory 63 may be interconnected and implement mutual communication through a bus. The bus may be an industry standard architecture (Industry Standard Architecture, ISA) bus, a peripheral component interconnect (Peripheral Component Interconnect, PCI) bus, an Extended Industry Standard Architecture (Extended Industry Standard Architecture, EISA) bus, or the like. The bus may be classified into an address bus, a data bus, a control bus, and the like. For convenience of denotation, the bus is represented by using only one thick line in FIG. 8; however, it does not indicate that there is only one bus or only one type of buses.

Optionally, in specific implementation, if the communications interface 61, the processor 62, and the memory 63 are integrated into a chip for implementation, the communications interface 61, the processor 62, and the memory 63 may implement mutual communication through an internal interface.

The apparatus for notifying a network abnormality in this embodiment may be a controller.

Function modules of the apparatus for notifying a network abnormality provided in this embodiment may be configured to execute the method for notifying a network abnormality shown in FIG. 2, and a specific operating principle of the method is not repeated herein. For details, reference is made to the description of the method embodiment.

In this embodiment, a communications interface receives a first asynchronous message for describing an abnormality occurring in an OpenFlow network, where the first asynchronous message is sent when an OpenFlow switch detects that the abnormality occurs in the OpenFlow network; a processor processes, according to the first asynchronous message, the abnormality occurring in the OpenFlow network. Because an actively detecting manner is used by the OpenFlow switch, the abnormality occurring in the OpenFlow network may be notified in time, thereby improving efficiency in processing the abnormality occurring in the OpenFlow network. In addition, the abnormality is processed according to a type of the abnormality, thereby improving effectiveness of processing the abnormality occurring in the OpenFlow network.

It may be clearly understood by persons skilled in the art that, for the purpose of convenient and brief description, for a detailed working process of the foregoing apparatus and modules, reference may be made to a corresponding process in the foregoing method embodiments, and details are not described herein again.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A method for notifying a network abnormality, the method comprising:
    detecting, by an OpenFlow switch, whether an abnormality occurs in an OpenFlow network;
    sending, by the OpenFlow switch, a first asynchronous message to the controller when it is detected that the abnormality occurs in the OpenFlow network, wherein the first asynchronous message is used to indicate that the OpenFlow network is in an abnormal state; and
    receiving, by the OpenFlow switch, a query request message sent by the controller according to the first asynchronous message, wherein the query request message is used to instruct the OpenFlow switch to send a second asynchronous message; and
    sending, by the OpenFlow switch, the second asynchronous message to a controller when it is detected that an abnormality occurs in the OpenFlow network, causing the controller to process, according to the second asynchronous message, the abnormality occurring in the OpenFlow network, wherein the second asynchronous message is used to describe the abnormality occurring in the OpenFlow network.

2. The method for notifying a network abnormality according to claim 1, wherein detecting, by the OpenFlow switch, whether the abnormality occurs in the OpenFlow network comprises any one or combination of the following operations:
    detecting whether congestion occurs in the OpenFlow network;
    detecting whether a loop occurs in the OpenFlow network;
    detecting whether an unauthorized data flow exists in the OpenFlow network; and
    detecting whether a traffic abnormality occurs in the OpenFlow network.

3. The method for notifying a network abnormality according to claim 1, wherein the second asynchronous message comprises type information of the abnormality occurring in the OpenFlow network, the type information is used to indicate a type of the abnormality occurring in the OpenFlow network, and the type of the abnormality occurring in the OpenFlow network comprises at least one of the following: congestion occurring in a network, a loop occurring in a network, an unauthorized data flow existing in a network, and a traffic abnormality occurring in a network.

4. The method for notifying a network abnormality according to claim 3, wherein the second asynchronous message further comprises any one or combination of the following information:

level information of the abnormality occurring in the OpenFlow network, wherein the level information is used to indicate severity of the abnormality occurring in the OpenFlow network;

status information of a device that generates the abnormality occurring in the OpenFlow network, wherein the status information of the device comprises at least one of the following: statistical information of a port, statistical information of a queue, and statistical information of a flow table; and information about a data flow corresponding to the abnormality occurring in the OpenFlow network, wherein the information about the data flow is used to identify the data flow corresponding to the abnormality.

5. A method for notifying a network abnormality, the method comprising:

receiving, by a controller, a first asynchronous message sent by an OpenFlow switch, wherein the first asynchronous message is used to indicate that an Open Flow network is in an abnormal state; and sending, by the controller, a query request message to the Open Flow switch according to the first asynchronous message, wherein the query request message is used to instruct the OpenFlow switch to send a second asynchronous message;

receiving, by a controller, the second asynchronous message sent by the OpenFlow switch, wherein the second asynchronous message is generated and sent when the Open Flow switch detects an abnormality occurring in the OpenFlow network, and the second asynchronous message is used to describe the abnormality occurring in the Open Flow network; and processing, by the controller and according to the second asynchronous message, the abnormality occurring in the Open Flow network.

6. The method for notifying a network abnormality according to claim 5, wherein the second asynchronous message comprises type information of the abnormality occurring in the OpenFlow network, the type information is used to indicate a type of the abnormality occurring in the OpenFlow network, and the type of the abnormality occurring in the OpenFlow network comprises at least one of the following: congestion occurring in a network, a loop occurring in a network, an unauthorized data flow existing in a network, and a traffic abnormality occurring in a network.

7. The method for notifying a network abnormality according to claim 6, wherein processing, by the controller and according to the second asynchronous message, the abnormality occurring in the OpenFlow network comprises:

querying, according to the type information in the second asynchronous message, a mapping relationship between a preset type of an abnormality and an abnormality processing policy to acquire an abnormality processing policy corresponding to the type information, wherein the abnormality processing policy is used to indicate an operation used for eliminating the abnormality occurring in the OpenFlow network; and processing, according to the abnormality processing policy corresponding to the type information, the abnormality occurring in the OpenFlow network.

8. The method for notifying a network abnormality according to claim 6, wherein the second asynchronous message further comprises any one or combination of the following information:

level information of the abnormality occurring in the OpenFlow network, wherein the level information is used to indicate severity of the abnormality occurring in the OpenFlow network;

status information of a device that generates the abnormality occurring in the OpenFlow network, wherein the status information of the device comprises at least one of the following: statistical information of a port, statistical information of a queue, and statistical information of a flow table; and information about a data flow corresponding to the abnormality occurring in the OpenFlow network, wherein the information about the data flow is used to identify the data flow corresponding to the abnormality.

9. An apparatus for notifying a network abnormality, the apparatus comprising:

a detecting module, configured to detect whether an abnormality occurs in an OpenFlow network;

a sending module, configured to send a first asynchronous message to the controller, wherein the first asynchronous message is used to indicate that the OpenFlow network is in an abnormal state, and configured to send a second asynchronous message to a controller when it is detected that an abnormality occurs in the OpenFlow network, causing the controller to process, according to the second asynchronous message, the abnormality occurring in the OpenFlow network, wherein the second asynchronous message is used to describe the abnormality occurring in the OpenFlow network; and a receiving module, configured to receive a query request message sent by the controller and according to the first asynchronous message, wherein the query request message is used to instruct the OpenFlow switch to send the second asynchronous message.

10. The apparatus for notifying a network abnormality according to claim 9, wherein the detecting module is configured to execute any one or combination of the following operations:

detecting whether congestion occurs in the OpenFlow network;

detecting whether a loop occurs in the OpenFlow network;

detecting whether an unauthorized data flow exists in the OpenFlow network; and detecting whether an abnormality occurs in traffic of the OpenFlow network.

11. The apparatus for notifying a network abnormality according to claim 9, wherein the second asynchronous message comprises type information of the abnormality occurring in the OpenFlow network, the type information is used to indicate a type of the abnormality that occurs in the OpenFlow network, and the type of the abnormality that occurs in the OpenFlow network comprises at least one of the following: congestion occurring in a network, a loop occurring in a network, an unauthorized data flow existing in a network, and a traffic abnormality occurring in a network.

12. The apparatus for notifying a network abnormality according to claim 11, wherein the second asynchronous message further comprises any one or combination of the following information:

level information of the abnormality occurring in the OpenFlow network, wherein the level information is used to indicate severity of the abnormality occurring in the OpenFlow network;

status information of a device that generates the abnormality occurring in the OpenFlow network, wherein the status information of the device comprises at least one of the following: statistical information of a port, statistical information of a queue, and statistical information of a flow table; and information about a data flow corresponding to the abnormality occurring in the OpenFlow network, wherein the information about the data flow is used to identify the data flow corresponding to the abnormality.

13. An apparatus for notifying a network abnormality, the apparatus comprising:

a receiving module, configured to receive a first asynchronous message sent by an OpenFlow switch, wherein the first asynchronous message is used to indicate that an OpenFlow network is in an abnormal state, and configured to receive a second asynchronous message sent by the OpenFlow switch, wherein the second asynchronous message is sent when the OpenFlow switch detects an abnormality occurring in the OpenFlow network, and the second asynchronous message is used to describe the abnormality occurring in the OpenFlow network; and a processing module, configured to process, according to the second asynchronous message, the abnormality that occurs in the OpenFlow network; and a sending module, configured to send a query request message to the OpenFlow switch according to the second asynchronous message, wherein the query request message is used to instruct the OpenFlow switch to send the second asynchronous message.

14. The apparatus for notifying a network abnormality according to claim 13, wherein the second asynchronous message comprises type information of the abnormality occurring in the OpenFlow network, the type information is used to indicate a type of the abnormality occurring in the OpenFlow network, and the type of the abnormality occurring in the OpenFlow network comprises at least one of the following: congestion occurring in a network, a loop occurring in a network, an unauthorized data flow existing in a network, and a traffic abnormality occurring in a network.

15. The apparatus for notifying a network abnormality according to claim 14, wherein the processing module is configured to:

query, according to the type information in the first asynchronous message, a mapping relationship between a preset type of an abnormality and an abnormality processing policy to acquire an abnormality processing policy corresponding to the type information, wherein the abnormality processing policy is used to indicate an operation used for eliminating the abnormality occurring in the OpenFlow network; and process, according to the abnormality processing policy corresponding to the type information, the abnormality occurring in the OpenFlow network.

16. The apparatus for notifying a network abnormality according to claim 14, wherein the first asynchronous message further comprises any one or combination of the following information:

level information of the abnormality occurring in the OpenFlow network, wherein the level information is used to indicate severity of the abnormality occurring in the OpenFlow network;

status information of a device that generates the abnormality occurring in the OpenFlow network, wherein the status information of the device comprises at least one of the following: statistical information of a port, statistical information of a queue, and statistical information of a flow table; and information about a data flow corresponding to the abnormality occurring in the OpenFlow network, wherein the information about the data flow is used to identify the data flow corresponding to the abnormality.

* * * * *

UNITED STATES PATENT AND TRADEMARK OFFICE
CERTIFICATE OF CORRECTION

PATENT NO. : 9,819,590 B2  
APPLICATION NO. : 14/796692  
DATED : November 14, 2017  
INVENTOR(S) : Binzhang Fu et al.

Page 1 of 1

It is certified that error appears in the above-identified patent and that said Letters Patent is hereby corrected as shown below:

On the Title Page

Item (72), Inventors: Line 1, Binzhang Fu, delete "Being (CN)" and insert -- Beijing (CN) --.

Signed and Sealed this  
Nineteenth Day of June, 2018

Andrei Iancu  
*Director of the United States Patent and Trademark Office*